United States Patent
Seong et al.

(10) Patent No.: US 10,998,986 B2
(45) Date of Patent: May 4, 2021

(54) WIRELESS COMMUNICATION CIRCUIT FOR SUPPORTING ANTENNA SWITCHING AND DEVICE INCLUDING SAME

(71) Applicant: Samsung Electronics Co., Ltd., Gyeonggi-do (KR)

(72) Inventors: Ki Hyug Seong, Gyeonggi-do (KR); Dong Il Yang, Gyeonggi-do (KR); Hyo Seok Na, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/627,862

(22) PCT Filed: Jul. 27, 2018

(86) PCT No.: PCT/KR2018/008533
§ 371 (c)(1),
(2) Date: Dec. 31, 2019

(87) PCT Pub. No.: WO2019/022557
PCT Pub. Date: Jan. 31, 2019

(65) Prior Publication Data
US 2020/0127742 A1    Apr. 23, 2020

(30) Foreign Application Priority Data
Jul. 28, 2017 (KR) .................. 10-2017-0096023

(51) Int. Cl.
*H04B 17/24* (2015.01)
*H04B 17/10* (2015.01)
(Continued)

(52) U.S. Cl.
CPC .......... *H04B 17/102* (2015.01); *H01Q 1/243* (2013.01); *H04B 1/0053* (2013.01);
(Continued)

(58) Field of Classification Search
CPC .... H04B 17/102; H04B 17/24; H04B 17/318; H04B 17/336; H04B 1/0053; H04B 1/0064; H04B 7/06; H01Q 1/243
(Continued)

(56) References Cited

U.S. PATENT DOCUMENTS 5,689,814 A * 11/1997 Hagisawa ............ H04B 17/318
                                                                455/69
6,678,532 B1 * 1/2004 Mizoguchi ............ H01Q 1/241
                                                                343/702
(Continued)

FOREIGN PATENT DOCUMENTS

JP    2015-046789 A    3/2015
KR    10-2012-0006404 A    1/2012
(Continued)

OTHER PUBLICATIONS

Korean Search Report dated Mar. 16, 2021.

*Primary Examiner* — Hai V Nguyen
(74) *Attorney, Agent, or Firm* — Cha & Reiter, LLC.

(57) ABSTRACT

An electronic device is disclosed. In addition, various embodiments understood through the disclosure may be possible. The electronic device includes a first antenna and a second antenna, a wireless communication circuit that is electrically connected to the first antenna and the second antenna and transmits and/or receives a signal through the first antenna and the second antenna, a switch that is electrically connected to the wireless communication circuit and is selectively connected to one of the first antenna and the second antenna, and a detection circuit that measures a magnitude of a first signal transmitted through the first antenna and a magnitude of a second signal through the second antenna, the second signal being obtained from at least a part of the first signal transmitted through the first antenna.

10 Claims, 12 Drawing Sheets

(51) Int. Cl.
*H04B 17/318* (2015.01)
*H04B 17/336* (2015.01)
*H01Q 1/24* (2006.01)
*H04B 1/00* (2006.01)
*H04B 7/06* (2006.01)

(52) U.S. Cl.
CPC ............ *H04B 1/0064* (2013.01); *H04B 7/06* (2013.01); *H04B 17/24* (2015.01); *H04B 17/318* (2015.01); *H04B 17/336* (2015.01)

(58) Field of Classification Search
USPC ............................................... 455/13.3, 13.1
See application file for complete search history.

(56) References Cited

U.S. PATENT DOCUMENTS

| | | | | |
|---|---|---|---|---|
| 8,121,572 | B2* | 2/2012 | Lin | H03G 3/3068 |
| | | | | 455/232.1 |
| 8,892,049 | B2* | 11/2014 | Rosenblatt | H01Q 1/242 |
| | | | | 455/67.11 |
| 8,897,723 | B2* | 11/2014 | Lee | H04B 7/0805 |
| | | | | 455/91 |
| 9,379,761 | B2* | 6/2016 | Van Der Cammen | |
| | | | | H04B 1/0053 |
| 9,438,292 | B2 | 9/2016 | Sugimoto et al. | |
| 9,484,961 | B2 | 11/2016 | Lum et al. | |
| 9,673,884 | B2* | 6/2017 | Kang | H04B 7/0834 |
| 9,791,490 | B2* | 10/2017 | Pascolini | G01R 29/10 |
| 10,571,502 | B2* | 2/2020 | Pascolini | G01R 29/10 |
| 2009/0096683 | A1 | 4/2009 | Rosenblatt et al. | |
| 2009/0143028 | A1* | 6/2009 | Kim | H04B 17/318 |
| | | | | 455/90.2 |
| 2011/0028106 | A1* | 2/2011 | Lee | H04B 7/0805 |
| | | | | 455/101 |
| 2011/0223878 | A1* | 9/2011 | Lin | H04B 1/1027 |
| | | | | 455/226.2 |
| 2015/0065067 | A1 | 3/2015 | Sugimoto et al. | |
| 2015/0349833 | A1* | 12/2015 | van Der Cammen | |
| | | | | H04B 17/00 |
| | | | | 375/219 |
| 2016/0173185 | A1* | 6/2016 | Kang | H04B 7/0834 |
| | | | | 375/267 |

FOREIGN PATENT DOCUMENTS

KR 10-2015-0012644 A 2/2015
KR 10-1531053 B1 6/2015

* cited by examiner

WIRELESS COMMUNICATION CIRCUIT FOR SUPPORTING ANTENNA SWITCHING AND DEVICE INCLUDING SAME

CROSS REFERENCE TO RELATED APPLICATIONS

This application is a National Phase Entry of PCT International Application No. PCT/KR2018/008533, which was filed on Jul. 27, 2018, and claims a priority to Korean Patent Application No. 10-2017-0096023, which was filed on Jul. 28, 2017, the contents of which are incorporated herein by reference.

TECHNICAL FIELD

Embodiments disclosed herein relate to a wireless communication circuit for supporting antenna switching and a technique for controlling the same.

BACKGROUND ART

An electronic device that performs wireless communication such as a terminal may include a plurality of antennas. When a user of the electronic device holds only a portion corresponding to at least some of the plurality of antennas (e.g., the lower portion of the electronic device), the performance of at least one of the plurality of antennas may be deteriorated due to the user's hand. Therefore, it is necessary to perform switching of an antenna to be used according to the antenna state of the electronic device.

According to the prior art, the electronic device may determine whether to switch an antenna based on a received signal strength (e.g., a signal to noise ratio (SNR) or a received signal strength indicator (RSSI)) obtained through each of the plurality of antennas.

DISCLOSURE

Technical Problem

According to the prior art, there is a problem that a Tx signal having a different frequency from an Rx signal is not considered because the electronic device determines whether to switch the antenna based on the received signal strength obtained through each of the plurality of antennas. In this case, deterioration in transmission performance may occur due to antenna switching.

Various embodiments of the disclosure propose an electronic device and a method therefor, capable of supporting antenna switching using information on a Tx signal.

Technical Solution

The electronic device according to an embodiment disclosed therein may include a first antenna and a second antenna, a wireless communication circuit that is electrically connected to the first antenna and the second antenna and transmits and/or receives a signal through the first antenna and the second antenna, a switch that is electrically connected to the wireless communication circuit and be selectively connected to one of the first antenna and the second antenna, and a detection circuit that measures a magnitude of a first signal transmitted through the first antenna and a magnitude of a second signal through the second antenna, the second signal being obtained from at least a part of the first signal transmitted through the first antenna.

The electronic device according to an embodiment disclosed therein may include a first antenna and a second antenna, a wireless communication circuit that is electrically connected to the first antenna and the second antenna and transmit and/or receive a signal through the first antenna and the second antenna, a switch that is electrically connected to the wireless communication circuit and be selectively connected to one of the first antenna and the second antenna, and a processor electrically connected to the switch, wherein the processor determines one of the first antenna and the second antenna based on a magnitude of a first signal transmitted through the first antenna and a magnitude of a second signal through the second antenna, the second signal being obtained from at least a part of the first signal transmitted through the first antenna, and connects the determined antenna to the wireless communication circuit by using the switch.

As described above, according to the various embodiments disclosed therein, a method for an electronic device includes transmitting a signal through a first antenna, acquiring at least a part of the signal through a second antenna and measuring a magnitude of the acquired signal, determining one of the first antenna and the second antenna based at least on the magnitude of the acquired signal and connecting the determined antenna and a wireless communication circuit.

Advantageous Effects

According to embodiments disclosed in the disclosure, the electronic device may provide antenna performance optimized according to the antenna state by determining whether to switch the antenna by using information about a Tx signal.

According to the embodiments disclosed in the disclosure, the electronic device may provide transmission performance optimization, radiation performance optimization, and consumption current improvement effect by determining whether to switch the antenna using information on the Tx impedance of the antenna.

In addition, various effects may be provided that are directly or indirectly understood through the disclosure.

DESCRIPTION OF DRAWINGS

In the description of the drawings, the same or similar reference numerals may be used for the same or similar components.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
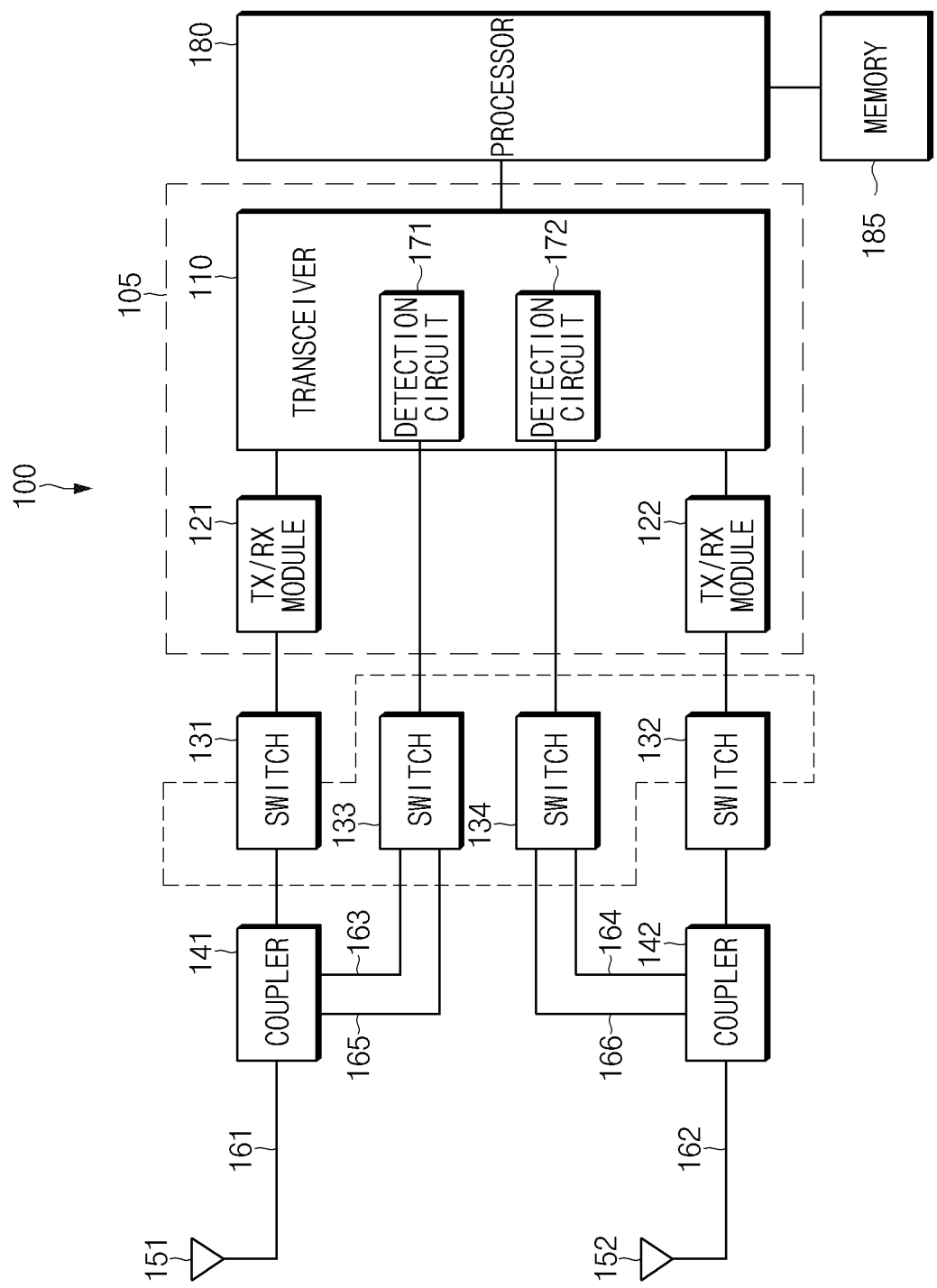
FIG. 1 is a block diagram of an electronic device for supporting antenna switching according to various embodiments of the disclosure.

FIG. 1 is a block diagram of an electronic device for supporting antenna switching according to various embodiments of the disclosure.

Referring to FIG. 1, an electronic device 100 may include a wireless communication circuit 105, switches 131 to 134, couplers 141 and 142, antennas 151 and 152, a processor 180, and a memory 185. According to various embodiments of the disclosure, the configuration of the electronic device 100 may be variously modified. For example, although FIG. 1 illustrates two antennas capable of transmitting and receiving signals, the electronic device 100 may include three or more antennas capable of transmitting and receiving signals.

According to an embodiment, the wireless communication circuit 105 may include components for processing signals transmitted and/or received through at least one antenna (e.g., the antennas 151 and 152). The wireless communication circuit 105 may include a transceiver 110, Transmit (Tx)/Receive (Rx) modules 121 and 122, and detection circuits 171 and 172.

According to an embodiment, the transceiver 110 may be a radio frequency (RF) transceiver or an RF integrated circuit (IC). The transceiver 110 may process a signal in an RF band. For example, the transceiver 110 may modulate a digital signal output from a modem to a signal in an RF state. As another example, the transceiver 110 may demodulate a received signal in the RF state into a signal in a digital state.

According to an embodiment, each of the Tx/Rx modules 121 and 122 may be a front end module (FEM) or a front end module including a duplexer (FEMID). The Tx/Rx modules 121 and 122 may be disposed between the transceiver 110 and the antennas 151 and 152 and may amplify and/or filter a signal in a radio frequency band. Each of the Tx/Rx modules 121 and 122 may include at least one of a power amplifier (PA), a filter circuit, a duplexer, and a switch.

According to an embodiment, each of the detection circuits 171 and 172 may be set to measure the magnitude of a signal transmitted and received through the antennas 151 and 152. For example, the detection circuit 171 is configured to measure the magnitude of a signal transmitted and/or received via the antenna 151, and the detection circuit 172 is configured to measure the magnitude of a signal transmitted and/or received via the antenna 152. As another example, the detection circuits 171 and 172 may measure magnitudes of signals reflected from the antennas 151 and 152 or determine impedances for the antennas 151 and 152, respectively. According to an embodiment, the wireless communication circuit 105 may include a detection circuit (e.g., the detection circuit 171 or 172) configured to determine a magnitude of a signal transmitted and/or received from the antennas 151 and 152, a magnitude of a signal reflected from the antennas 151 and 152, and determine the impedance for the antennas 151 and 152. According to an embodiment, each of the detection circuits 171 and 172 may be included in the transceiver 110.

According to one embodiment, each of the antennas 151 and 152 may be a dipole antenna, a monopole antenna, a patch antenna, a horn antenna, a parabolic antenna, a helical antenna, a slot antenna, a loop antenna, an inverted-F antenna, a planar inverted-F antenna, and a combination thereof. Each of the antennas 151 and 152 may transmit and/or receive a signal in a radio frequency band. For example, the antenna 151 may be configured to transmit and receive a signal, and the antenna 152 may be configured to receive a signal.

According to one embodiment, each of the couplers 141 and 142 may include a directional coupler or a bidirectional coupler. The couplers 141 and 142 may be disposed between the wireless communication circuit 105 and the antennas 151 and 152, respectively and transfer at least parts of signals transmitted and/or received via the antennas 151 and 152, or at least parts of signals reflected from the antennas 151 and 152 to the detection circuits 171 and 172, respectively. For example, the coupler 141 may transfer at least a part of a Tx signal transferred from the wireless communication circuit 105 to the antenna 151 to the detection circuit 171, and transfer at least a part of a signal reflected from the antenna 151 to the detection circuit 171. As another example, the coupler 142 may transfer at least a part of an Rx signal, transferred from the antenna 152 to the wireless communication circuit 105, to the detection circuit 172, and transfer at least a part of a signal, transferred from the wireless communication circuit 105 to the antenna 152, to the detection circuit 172. As another example, the couplers 141 and 142 may transfer at least parts of signals transmitted and/or received through the antennas 151 and 152, or at least parts of signals reflected from the antennas 151 and 152 to one detection circuit (e.g., the detection circuit 171 or the detection circuit 172). Although FIG. 1 illustrates the electronic device 100 including the couplers 141 and 142, according to various embodiments of the disclosure, the electronic device 100 may not include at least one of the couplers 141 and 142 to reduce a mounting space.

According to one embodiment, each of the switches 133 and 134 may be a single pole single throw (SPST) switch, a single pole double throw (SPDT) switch, a double pole single throw (DPST) switch, or a double pole double throw (DPDT) switch, or a combination thereof. The switch 133 may transfer one of at least two or more signals transferred from the coupler 141 to the detection circuit 171. The at least two or more signals may include, for example, at least a part of a signal transmitted from the wireless communication circuit 105 to the antenna 151 and at least a part of a signal reflected from the antenna 151. The switch 134 may transfer one of at least two or more signals transferred from the coupler 142 to the detection circuit 172. The at least two or more signals may include, for example, at least a part of a signal received via the antenna 152 and at least a part of a signal transferred from the wireless communication circuit 105 to the antenna 152.

According to one embodiment, each of the switches 131 and 132 may be an SPST switch, an SPDT switch, a DPST switch, a DPDT switch, or a combination thereof. In addition, the switches 131 and 132 may constitute a single DPST switch or a single DPDT switch. Each of the switches 131 and 132 may be electrically connected to the wireless communication circuit 105, and may be connected to one of the antennas 151 and 152. The switches 131 and 132 may be disposed between the wireless communication circuit 105 and the couplers 141 and 142, respectively.

According to one embodiment, the processor 180 may be electrically connected to the detection circuits 171 and 172 and the switches 131 to 134. The processor 180 may be configured to select one antenna based on a magnitude of a signal transmitted and/or received through the antenna 151 or 152, and connect the selected antenna and the wireless communication circuit 105 using the switches 131 to 134. For example, the processor 180 may measure a magnitude of a signal transmitted through the antenna 151 using the detection circuit 171, and then measure a magnitude of a signal, received through the antenna 152 after being transmitted through the antenna 151, using the detection circuit 172. Based on the measured magnitudes of the two signals, the processor 180 may select one of the antennas 151 and 152. The processor 180 may store data in the memory 185 or load data stored in the memory 185.

According to one embodiment, the memory 185 may store instructions or data for causing the processor 180 to control the switches 131 and 132. In addition, the memory 185 may store information used by the processor 180 to select an antenna (e.g., a magnitude of a Tx/Rx signal, an impedance, an impedance threshold range and/or a signal magnitude threshold value).

According to one embodiment, the wireless communication circuit 105, the switches 131 to 134, the couplers 141 and 142, the antennas 151 and 152, the processor 180, and the memory 185 may be connected via Tx paths. For example, a signal output from the wireless communication circuit 105 may be transferred to the antenna 151 through a Tx path 161. For another example, a signal received via the antenna 152 may be transferred to the wireless communication circuit 105 via a Tx path 162. For another example, at least a part of the signal output from the wireless communication circuit 105 may be transferred to the detection circuit 171 via a Tx path 163, and at least a part of the signal reflected from the antenna 151 may be transferred to the detection circuit 171 via a Tx path 165. For another example, at least a part of the signal received via the antenna 152 may be transferred to the detection circuit 172 via a Tx path 164, and at least a part of the signal output through the wireless communication circuit 105 may be transferred to the detection circuit 172 via a Tx path 166. Each of Tx paths (e.g., the Tx paths 161 to 166) of the electronic device 100 may be a coaxial cable path, a microstrip Tx path, a stripline Tx path, an edge-coupled microstrip Tx path, an edge-coupled stripline Tx path, and a combination thereof.

Figure 2:
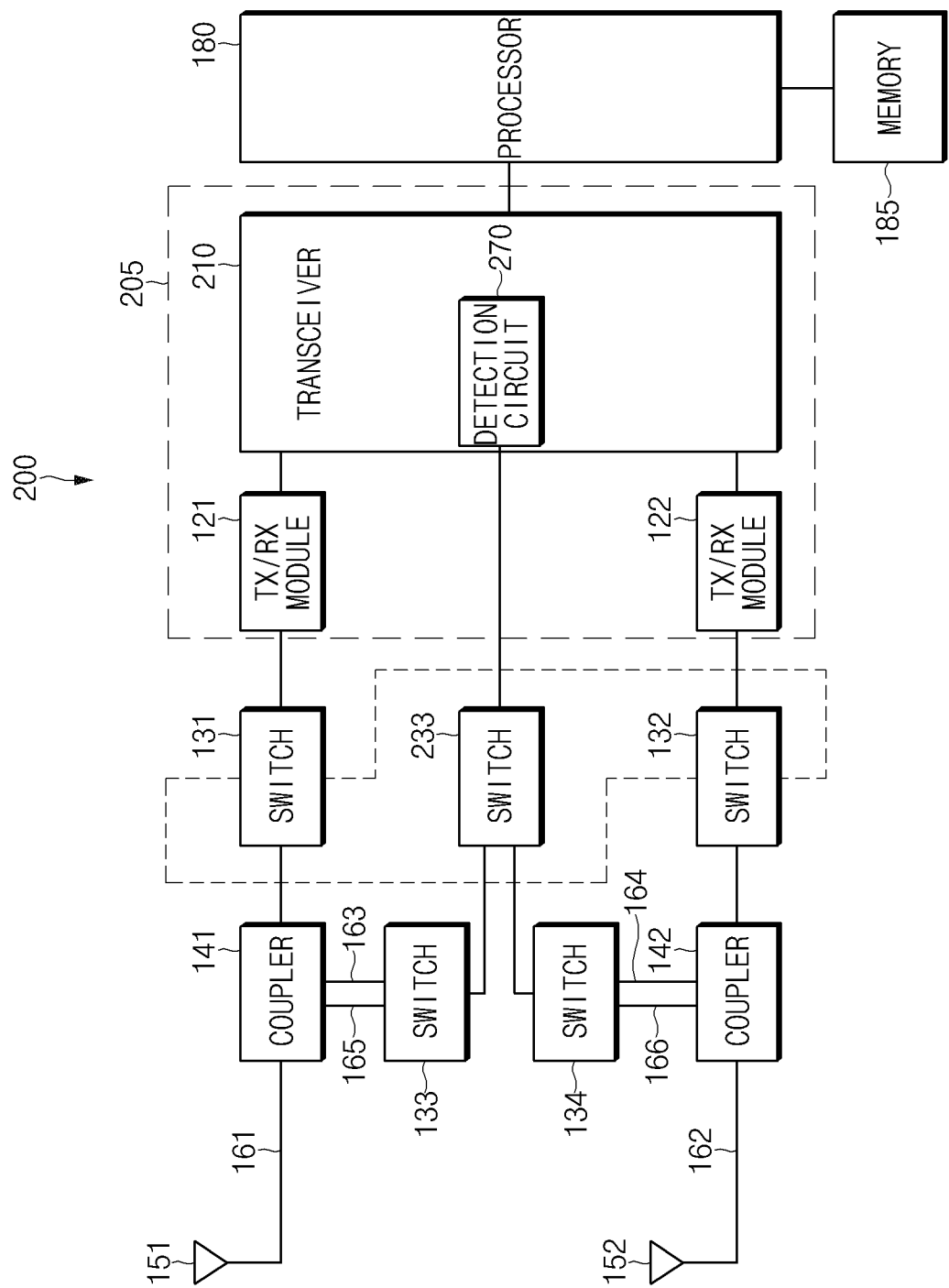
FIG. 2 is another block diagram of an electronic device for supporting antenna switching according to various embodiments of the disclosure.

FIG. 2 is another block diagram of an electronic device for supporting antenna switching according to various embodiments of the disclosure. The components shown in FIG. 2 may perform the same or similar functions as the components including similar reference numerals shown in FIG. 1.

Referring to FIG. 2, an electronic device 200 (e.g., the electronic device 100) may include a wireless communication circuit 205 (e.g., the wireless communication circuit 105), the switches 131 to 134, the couplers 141 and 142, the antennas 151 and 152, the processor 180, and the memory 185. The switches 131 to 134, the couplers 141 and 142, the antennas 151 and 152, the processor 180, and the memory 185 are the same or similar to the components including the same references, respectively, which are included in the electronic device 100 of FIG. 1 and therefore, a detailed description thereof will be omitted.

According to one embodiment, the wireless communication circuit 205 may include a detection circuit 270 configured to measure a magnitude of a signal transmitted and received through the antenna 151 and a magnitude of a signal transmitted and received through the antenna 152. According to one embodiment, the detection circuit 270 may be included in a transceiver 210 (e.g., the transceiver 110).

According to one embodiment, the electronic device 200 may further include a switch 233. The switch 233 may be an SPST switch, an SPDT switch, a DPST switch, or a DPDT switch or a combination thereof. According to one embodiment, the switch 233 may be disposed between the detection circuit 270 and the couplers 141 and 142 (or the switches 133 to 134). In this case, the switch 233 may be connected to one of the couplers 141 and 142. For example, when the switch 233 is coupled to the coupler 141 (or the switch 133), the coupler 141 may transfer at least a part of a signal transferred from wireless communication circuit 205 to the antenna 151 and/or at least a part of a signal reflected from the antenna 151 to the detection circuit 270 through the switch 133. As another example, when the switch 233 is coupled to the coupler 142 (or the switch 134), the coupler 142 may be configured to transfer at least a part of a signal received via the antenna 152 and/or at least a part of a signal transferred from the wireless communication circuit 205 to the antenna 152 to the detection circuit 270 through the switch 134. According to another embodiment, when the electronic device 200 does not include at least one of the couplers 141 and 142, the switch 233 may be disposed between the antennas 151 and 152 and the detection circuit 270.

Figure 3:
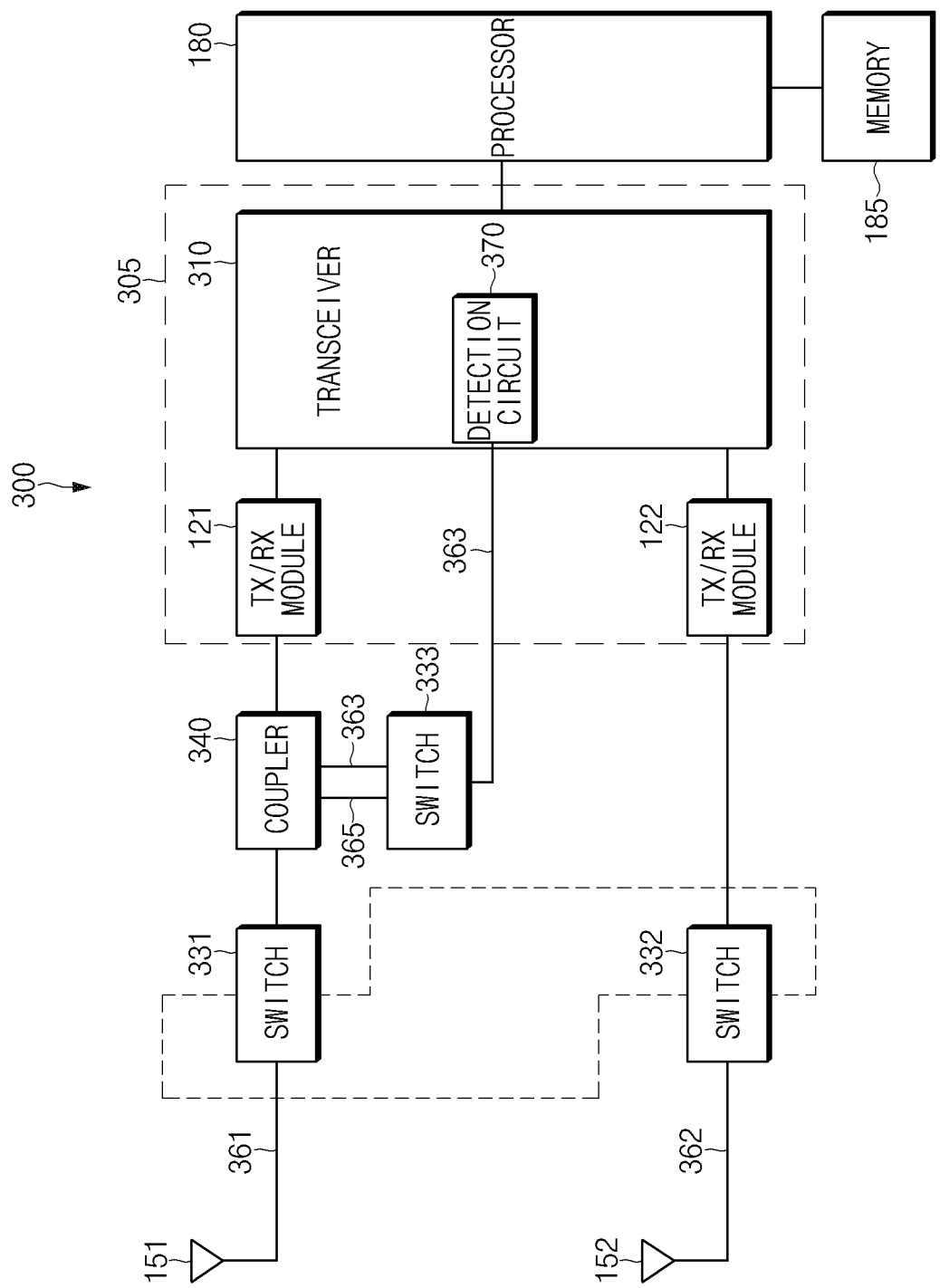
FIG. 3 is still another block diagram of an electronic device for supporting antenna switching according to various embodiments of the disclosure.

FIG. 3 is still another block diagram of an electronic device for supporting antenna switching according to various embodiments of the disclosure. Each of the components shown in FIG. 3 may perform the same or similar function as each of the components including similar reference numerals shown in FIGS. 1 and 2.

Referring to FIG. 3, an electronic device 300 (e.g., the electronic device 100 or the electronic device 200) may include a wireless communication circuit 305 (e.g., the wireless communication circuit 205), the antennas 151 and 152, the processor 180, and the memory 185. Descriptions for the antennas 151 and 152, the processor 180, and the memory 185 are the same as or similar to those of the components including the same reference numerals included in the electronic device 100 of FIG. 1, and therefore, a detailed description thereof will be omitted.

According to one embodiment, the wireless communication circuit 305 may include a detection circuit 370 configured to measure a magnitude of a signal transmitted and received through the antenna 151 or 152. According to one embodiment, the detection circuit 370 may be included in a transceiver 310 (e.g., the transceiver 210).

According to one embodiment, a coupler 340 may include a directional coupler or a bidirectional coupler. The coupler 340 may be disposed between the wireless communication circuit 305 and switches 331 and 332, and transfer at least parts of signals transmitted and/or received via the antennas 151 and 152, or at least parts of signals reflected from the antennas 151 and 152 to the detection circuit 370. Although FIG. 3 illustrates only the coupler 340 disposed between the wireless communication circuit 305 and the switch 331, according to various embodiments of the disclosure, the coupler 340 may be disposed between the wireless communication circuit 305 and the switch 332. In this case, the switch 333 and Tx paths 363 to 365 may also be disposed between the coupler 340 and the detection circuit 370 disposed differently. According to one embodiment, the switch 333 may be an SPST switch, an SPDT switch, a DPST switch, or a DPDT switch, or a combination thereof. The switch 333 may transfer at least one signal transferred from the coupler 340 to the detection circuit 370. The at least one signal may be, for example, at least a part of a signal transmitted from the wireless communication circuit 305 to the antenna 151, or at least a part of a signal reflected from the antenna 151. When the coupler 340 is disposed between the switch 332 and the wireless communication circuit 305, the coupler 340 may transfer at least a part of a signal, received through the antenna 152, or at least a part of a signal, transferred from the wireless communication circuit 305 to the antenna 152, to the detection circuit 370.

According to one embodiment, each of the switches 331 and 332 may be an SPST switch, an SPDT switch, a DPST switch, a DPDT switch, or a combination thereof. In addition, the switches 331 and 332 may constitute a single DPST switch or a single DPDT switch. The switches 331 and 332 may be disposed between the antennas 151 and 152 and the coupler 340, respectively. The processor 180 may measure a magnitude of a signal transmitted and received through the antenna 151 or a Tx/Rx impedance for the antenna 151 (for another example, a magnitude of a signal transmitted or received through the antenna 152 or a Tx/Rx impedance for the antenna 152 when the coupler 340 is disposed between the 332 and the wireless communication circuit 305) by measuring a signal to be transferred through the coupler 340.

According to one embodiment, the wireless communication circuit 305, the switches 331 to 333, the coupler 340, the antennas 151 and 152, the processor 180, and the memory 185 may be connected via Tx paths. For example, a signal output from the wireless communication circuit 305 may be transferred to the antenna 151 through a Tx path 361. For another example, a signal received via the antenna 152 may be transferred to the wireless communication circuit 305 via a Tx path 362. For another example, at least a part of a signal output from the wireless communication circuit 305 may be transferred to the detection circuit 370 via a Tx path 363. For another example, at least a part of a signal reflected from the antenna 151 may be transferred to the detection circuit 370 via the Tx path 363. Each of Tx paths (e.g., the Tx paths 361 to 365) of the electronic device 100 may be a coaxial cable path, a microstrip Tx path, a stripline Tx path, an edge-coupled microstrip Tx path, an edge-coupled stripline Tx path, and a combination thereof.

As described above, according to various embodiments of the disclosure, an electronic device (e.g., the electronic device 100, 200, or 300) may include a first antenna (e.g., the antenna 151) and a second antenna (e.g., the antenna 152), a wireless communication circuit (e.g., the wireless communication circuit 105, 205, or 305) that is electrically connected to the first antenna and the second antenna and transmits and/or receives a signal through the first antenna and the second antenna, a switch (e.g., the switches 131 and 132 or the switches 331 and 332) that is electrically connected to the wireless communication circuit and is selectively connected to one of the first antenna and the second antenna, and a detection circuit (e.g., the detection circuits 171 and 172, 270, or 370) that measures a magnitude of a first signal transmitted through the first antenna and a magnitude of a second signal through the second antenna, the second signal being obtained from at least a part of the first signal transmitted through the first antenna.

According to an embodiment, the electronic device may further include a first coupler (e.g., the coupler 141 or 340) disposed between the first antenna and the wireless communication circuit to transfer at least a part of a signal output from the wireless communication circuit and at least a part of a signal reflected from the first antenna to the detection circuit and a second coupler (e.g., the coupler 142) disposed between the second antenna and the wireless communication circuit to transfer at least a part of the second signal to the detection circuit. Furthermore, the detection circuit may include a first detection circuit (e.g., the detection circuit 171) that is electrically connected to the first coupler to measure a magnitude of the first signal based on a difference between a magnitude of a signal output from the wireless communication circuit and a magnitude of a signal reflected from the first antenna, and a second detection circuit (e.g., the detection circuit 172) that is electrically connected to the second coupler to measure a magnitude of the second signal. Furthermore, the switch may be disposed between couplers and the wireless communication circuit, the couplers including the first coupler and the second coupler. Furthermore, the electronic device may further include another switch (e.g., the switch 233 or 333) disposed between couplers, the couplers including the first coupler and the second coupler, and the detection circuit and connected to one of the first coupler and the second coupler.

According to one embodiment, the first detection circuit may measure a first impedance corresponding to the first antenna. Furthermore, the second detection circuit may measure a second impedance corresponding to the second antenna. Furthermore, the wireless communication circuit may include the detection circuit.

As described above, according to various embodiments of the disclosure, an electronic device (e.g., the electronic device 100, 200, or 300) may include a first antenna (e.g., the antenna 151) and a second antenna (e.g., the antenna 152), a wireless communication circuit (e.g., the wireless communication circuit 105, 205, or 305) that is electrically connected to the first antenna and the second antenna and transmit and/or receive a signal through the first antenna and the second antenna, a switch (e.g., the switches 131 and 132 or the switch 331) that is electrically connected to the wireless communication circuit and is selectively connected to one of the first antenna and the second antenna, and a processor (e.g., the processor 180) electrically connected to the switch, wherein the processor may determine one of the first antenna and the second antenna based on a magnitude of a first signal transmitted through the first antenna and a magnitude of a second signal through the second antenna, the second signal being obtained from at least a part of the first signal transmitted through the first antenna, and connect the determined antenna to the wireless communication circuit by using the switch.

According to one embodiment, the electronic device may further include a detection circuit that measures the magnitude of the first signal and the magnitude of the second signal, wherein the processor may determine one of the first antenna and the second antenna based on a difference between the magnitude of the first signal and the magnitude of the second signal.

According to one embodiment, the processor may determine a first impedance corresponding to the first antenna and determine one of the first antenna and the second antenna based on the first impedance. Furthermore, the processor may connect the second antenna to the wireless communication circuit by using the switch when the first impedance is outside of a threshold range, and connect the first antenna to the wireless communication circuit by using the switch when the first impedance is within the threshold range. Furthermore, the processor may determine a second impedance corresponding to the second antenna and determine one of the first antenna and the second antenna based on the first impedance and the second impedance.

According to one embodiment, the processor may determine a magnitude of a received signal of the first antenna and a magnitude of a received signal of the second antenna, and determine one of the first antenna and the second antenna based on the magnitude of the received signal of the first antenna and the magnitude of the received signal of the second antenna.

According to one embodiment, the processor may determine a first impedance corresponding to the first antenna, determine a magnitude of a received signal of the first antenna and a magnitude of a received signal of the second antenna when the first impedance is outside of a threshold range, and determine one of the first antenna and the second antenna based on the magnitude of the received signal of the first antenna and the magnitude of the received signal of the second antenna.

Figure 4:
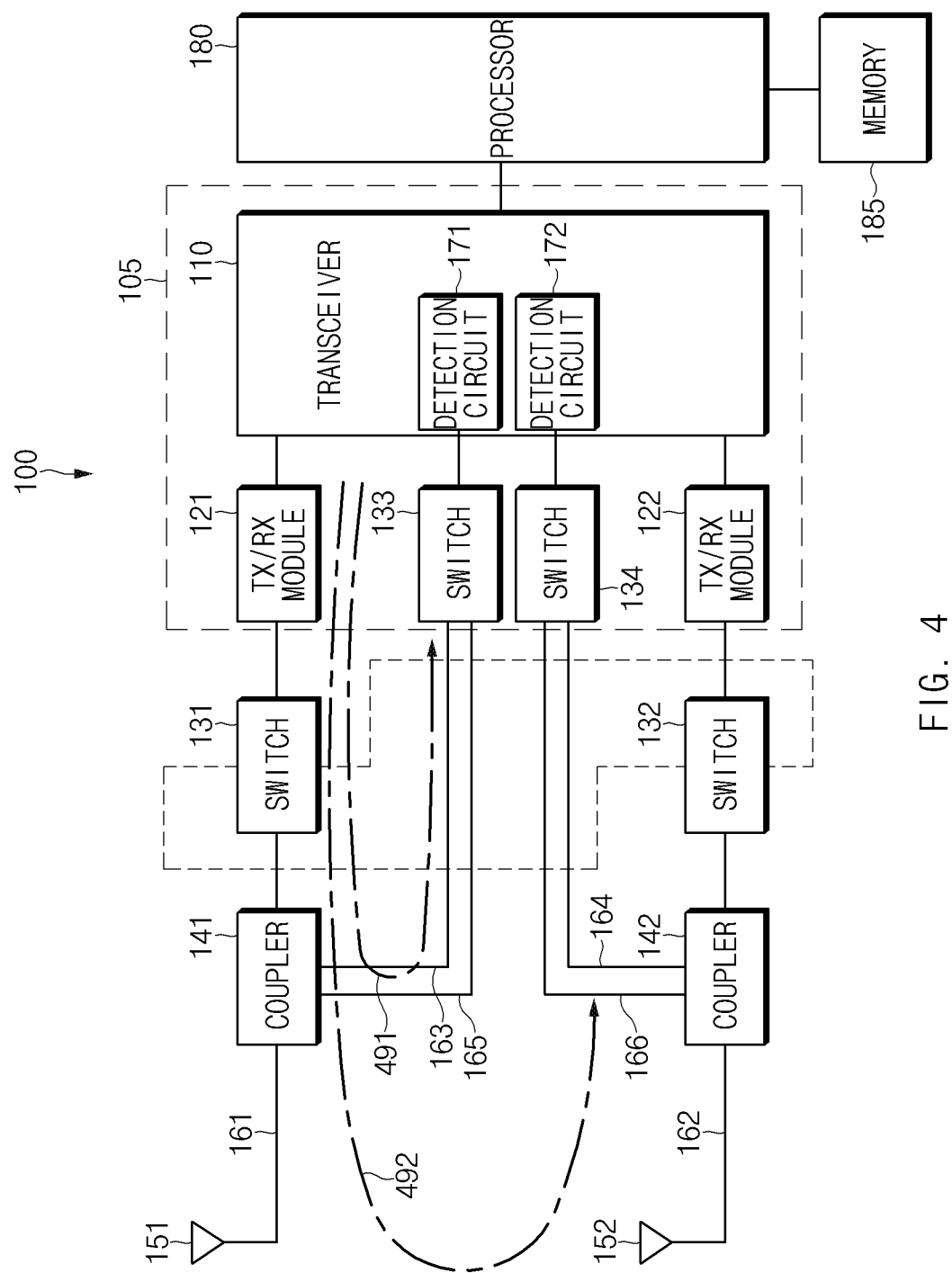
FIG. 4 is a block diagram of an electronic device for switching from a first antenna to a second antenna according to various embodiments of the disclosure.

FIG. 4 is a block diagram of an electronic device for switching from a first antenna to a second antenna according to various embodiments. The components shown in FIG. 4 may perform the same or similar functions as the components including similar reference numerals shown in FIG. 1. In addition, although an antenna switching operation is described with reference to FIG. 4 by using the block diagram of the electronic device 100 as an example, the same operational principle may be implemented in the electronic devices 200 and 300.

In FIG. 4, it is assumed that the wireless communication circuit 105 is connected to the antenna 151 to transmit a signal. Along a path 491, at least a part of the signal output from the wireless communication circuit 105 may be transferred to the detection circuit 171 through the coupler 141, the Tx path 163, and the switch 133. The processor 180 may measure a magnitude of a signal transmitted from the electronic device 100 through the antenna 151 (hereinafter, referred to as a "first signal") based on a magnitude of a signal transferred through the path 491. For example, the processor 180 may determine the magnitude of the first signal based on a difference between the magnitude of the signal transferred through the path 491 and a magnitude of a signal reflected from the antenna 151 and transferred to the detection circuit 171 through the Tx path 161, the coupler 141, and the Tx path 165.

Along a path 492, at least a part of the signal (that is, the first signal) output from the wireless communication circuit 105 and output through the Tx path 161 and the antenna 151 may be introduced into the antenna 152 and then transferred to the detection circuit 172 via the Tx path 162 and the Tx path 164. The processor 180 may measure a magnitude of a signal transmitted via the antenna 151 and received through the antenna 152 (hereinafter, referred to as a "second signal") based on a magnitude of a signal transferred through the path 492. For example, the processor 180 may determine the magnitude of the second signal based on the magnitude of the signal obtained through the Tx path 162 and the Tx path 164.

The magnitude of the first signal and the magnitude of the second signal may vary according to a surrounding state of the electronic device 100. For example, when the user of the electronic device 100 holds only a portion corresponding to the antenna 152, the magnitude of the first signal transmitted through the antenna 151 may be maintained while the magnitude of the second signal received through the antenna 152 may be smaller. The processor 180 may determine whether to switch from the antenna 151 to the antenna 152 based on a difference between the measured magnitude of the first signal and the measured magnitude of the second signal.

Figure 5:
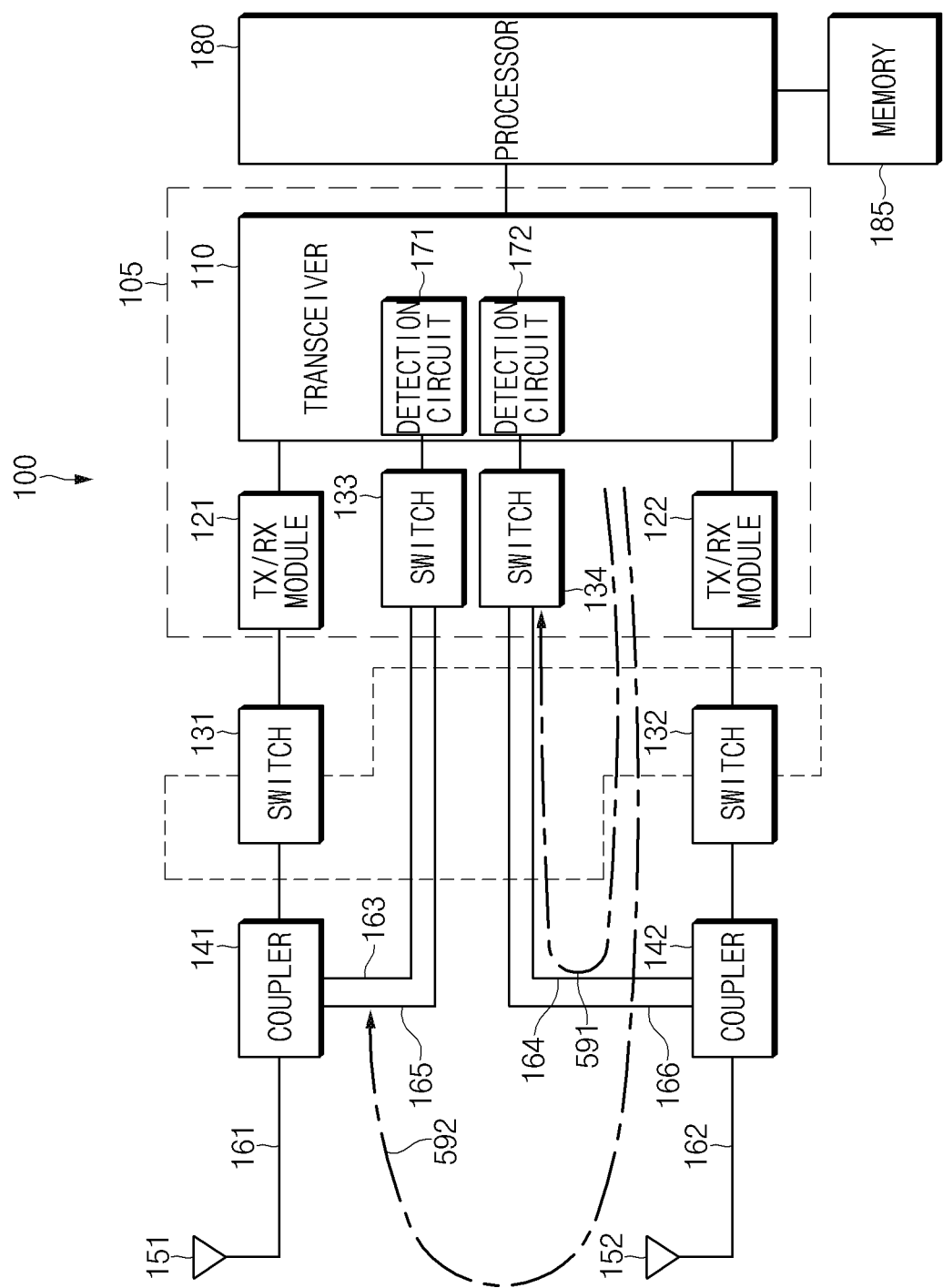
FIG. 5 is a block diagram of an electronic device for switching from a second antenna to a first antenna according to various embodiments.

FIG. 5 is a block diagram of an electronic device for switching from a second antenna to a first antenna according to various embodiments. The components shown in FIG. 5 may perform the same or similar functions as the components including similar reference numerals shown in FIG. 1. In addition, although an antenna switching operation is described with reference to FIG. 5 by using the block diagram of the electronic device 100 as an example, the same operational principle may be implemented in the electronic devices 200 and 300.

In FIG. 5, it is assumed that the wireless communication circuit 105 is connected to the antenna 151 to transmit a signal. Along a path 591, at least a part of the signal output from the wireless communication circuit 105 may be transferred to the detection circuit 172 through the coupler 142, the Tx path 166, and the switch 133. The processor 180 may measure a magnitude of a signal transmitted from the electronic device 100 through the antenna 152 (hereinafter, referred to as a "third signal") based on a magnitude of a signal transferred through the path 591. For example, the processor 180 may determine the magnitude of the third signal based on a difference between the magnitude of the signal transferred through the path 591 and a magnitude of a signal reflected from the antenna 152 and transferred to the detection circuit 172 through the Tx path 162, the coupler 142, and the Tx path 164.

Along a path 592, at least a part of the signal (that is, the third signal) output from the wireless communication circuit 105 and output through the Tx path 162 and the antenna 152 may be introduced into the antenna 151 and then transferred to the detection circuit 171 via the Tx path 161 and the Tx path 165. The processor 180 may measure a magnitude of a signal transmitted via the antenna 152 and received through the antenna 151 (hereinafter, referred to as a "fourth signal") based on a magnitude of a signal transferred through the path 592. For example, the processor 180 may determine the magnitude of the fourth signal based on the magnitude of the signal obtained through the Tx path 161 and the Tx path 165.

The processor 180 may determine whether to switch from the antenna 152 to the antenna 151 based on a difference between the magnitude of the measured third signal and the magnitude of the measured fourth signal because the magnitude of the third signal and the magnitude of the fourth signal may vary according to the surrounding state of the electronic device 100.

Figure 6:
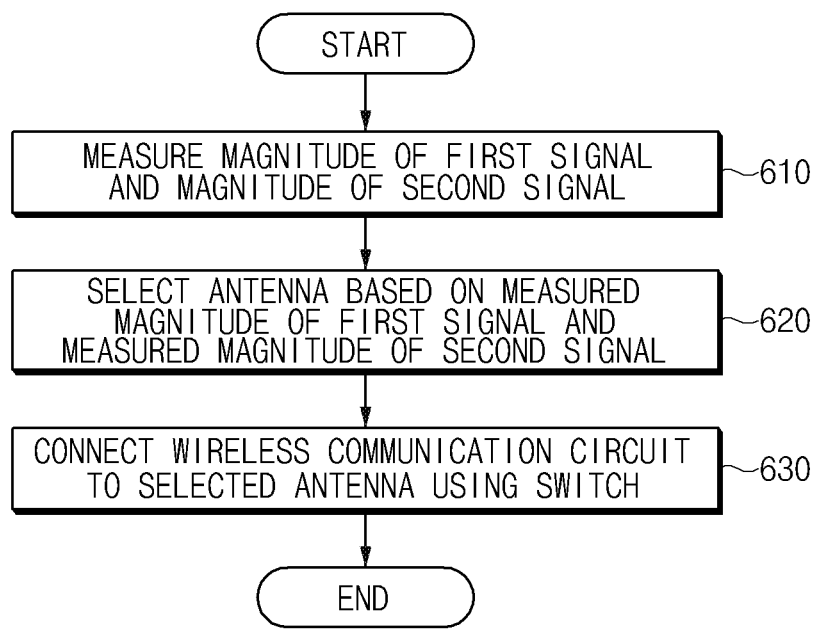
FIG. 6 is a flowchart illustrating an operation of an electronic device for operating antenna switching based on a magnitude of a Tx signal according to various embodiments.

FIG. 6 is a flowchart illustrating an operation of an electronic device for operating antenna switching based on a magnitude of a Tx signal according to various embodiments. The operations shown in FIG. 6 may be performed by an electronic device (e.g., the electronic device 100, 200, or 300) or a processor (e.g., the processor 180) included in the electronic device.

According to various embodiments disclosed in the disclosure, the electronic device may select an antenna based on the magnitude of a signal obtained through the antenna and connect the selected antenna to a wireless communication circuit using a switch.

Referring to FIG. 6, in operation 610, the electronic device (e.g., the processor 180) may measure a magnitude of a signal (that is, the first signal) transmitted through a first antenna (e.g., the antenna 151) among a plurality of antennas and measure a magnitude of the signal (that is, the second signal) transmitted through the first antenna and received through a second antenna (e.g., the antenna 152). For example, referring to FIG. 4, the electronic device 100 may determine the magnitude of the first signal based on a difference between the magnitude of a signal transferred through the path 491 and the magnitude of a signal reflected from the antenna 151 and determine the magnitude of the second signal based on the magnitude of a signal transferred through the path 492. The magnitude of the first signal and the magnitude of the second signal may be expressed in signal power (unit: dBm), or in magnitude and phase in the Smith chart. The electronic device may measure the magnitude of the first signal and the magnitude of the second signal using detection circuits (e.g., the detection circuits 171 and 172).

In operation 620, the electronic device may select one of the plurality of antennas based on the measured magnitude of the first signal and the measured magnitude of the second signal. According to one embodiment, the electronic device may select an antenna based on a difference between the magnitude of the first signal and the magnitude of the second signal. The electronic device may select an antenna based on whether the difference between the magnitude of the first signal and the magnitude of the second signal satisfies a predetermined threshold value. For example, when the difference between the measured magnitude of the first signal and the measured magnitude of the second signal is less than the predetermined threshold value (that is, (the magnitude of the first signal−the magnitude of the second signal)<threshold value), the electronic device may select the second antenna. In another example, when the difference between the measured magnitude of the first signal and the measured magnitude of the second signal is greater than or equal to the predetermined threshold value (that is, (the magnitude of the first signal−the magnitude of the second signal)≥threshold value), the electronic device may select the first antenna. The threshold value may be determined based on the magnitude of the first signal and the magnitude of the second signal in a state where there is no external object (e.g., a user's hand) around the electronic device. The threshold value may be expressed in signal power (unit: dBm), or in magnitude and phase in the Smith chart. The threshold value may be stored in the electronic device (e.g., the memory 185) in the form of a lookup table.

In operation 630, the electronic device may connect the selected antenna to a wireless communication circuit (e.g., the wireless communication circuit 105) using a switch (e.g., the switches 131 and 132). For example, referring to FIG. 4, the electronic device 100 may maintain a current state when the antenna 151 is selected, and connect the antenna 152 to the wireless communication circuit 105 by using the switches 131 and 132 when the antenna 152 is selected because the antenna 151 is in a state of being connected to the wireless communication circuit 105. For another example, referring to FIG. 5, the electronic device 100 may connect the antenna 151 to the wireless communication circuit 105 using the switches 131 and 132 when the antenna 151 is selected, and maintain a current state when the antenna 152 is selected because the antenna 152 is in a state of being connected to the wireless communication circuit 105.

The operations shown in FIG. 6 may be modified according to various embodiments of the disclosure, and the order of the operations may be changed. In addition, the operations are not necessarily to be performed sequentially, and the operations may be performed at the same time.

Figure 7:
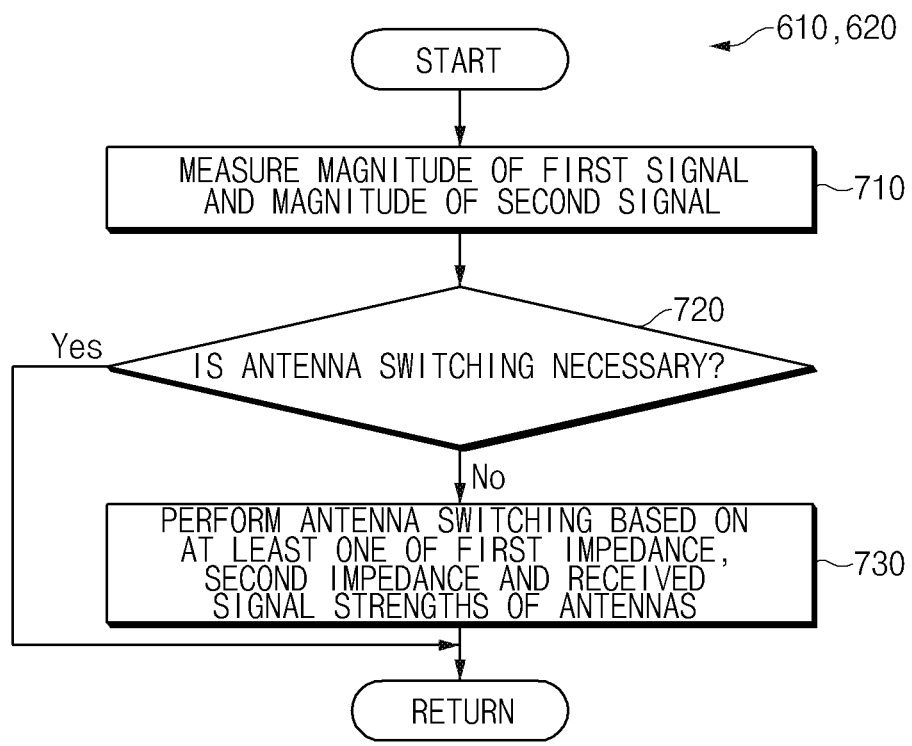
FIG. 7 is a flowchart of an operation of an electronic device for operating antenna switching based on at least one of a magnitude of a Tx signal, an antenna impedance, and a magnitude of a Rx signal according to various embodiments.

FIG. 7 is a flowchart of an operation of an electronic device for operating antenna switching based on at least one of a magnitude of a Tx signal, an antenna impedance, and a magnitude of a Rx signal according to various embodiments. The operations shown in FIG. 7 may represent the processes of operations 610 and 620 of FIG. 6 in more detail. The operations shown in FIG. 7 may be performed by an electronic device (e.g., the electronic device 100, 200, or 300) or a processor (e.g., the processor 180) included in the electronic device.

According to various embodiments of the disclosure, when a difference between the magnitude of the first signal and the magnitude of the second signal is not less than a threshold value, the electronic device may select an antenna based on other parameters (e.g., the first impedance, the second impedance, or received signal strengths of the antennas).

Referring to FIG. 7, in operation 710, the electronic device (e.g., the processor 180) may measure a magnitude of a first signal transmitted through a first antenna (e.g., the antenna 151) and a magnitude of a second signal obtained by receiving the first signal through a second antenna (e.g., the antenna 152).

In operation 720, the electronic device may determine whether an antenna connected to a wireless communication circuit (e.g., the wireless communication circuit 105) needs to be switched based on a difference between the magnitude of the first signal and the magnitude of the second signal. When the antenna needs to be switched, the electronic device may terminate the algorithm of FIG. 7 without further determining antenna performance. Even when the antenna does not need to be switched, the electronic device may proceed to operation 730 to measure more accurate antenna performance using other parameter values. For example, referring to FIG. 4, the electronic device may switch from the antenna 151 to the antenna 152 when the difference between the magnitude of the first signal and the magnitude of the second signal is less than the threshold value, while the electronic device may proceed to operation 730 when the difference between the magnitude of the first signal and the magnitude of the second signal is greater than or equal to the threshold value, because the antenna 151 is in a state of being connected to the wireless communication circuit 105. For another example, referring to FIG. 5, the electronic device may proceed to operation 730 when the difference between the magnitude of the first signal and the magnitude of the second signal is less than the threshold value, while the electronic device may switch from the antenna 152 to the antenna 151 when the difference between the magnitude of the first signal and the magnitude of the second signal is greater than or equal to the threshold value, because the antenna 151 is in a state of being connected to the wireless communication circuit 105.

In operation 730, the electronic device may select an antenna based on at least one of a first impedance corresponding to the first antenna, a second impedance corresponding to the second antenna, or received signal strengths of the antennas. According to one embodiment, the electronic device may select an antenna based on whether the first impedance is within a predetermined threshold range in the Smith chart. The first impedance may include a Tx impedance or a Rx impedance of the first antenna. The threshold range may be used to determine the Tx/Rx performance of an antenna in the Smith chart. The threshold range may be stored in the electronic device (e.g., the memory 185) in the form of a lookup table. According to another embodiment, the electronic device may select an antenna by comparing the first impedance and the second impedance. The second impedance may include a Tx impedance or a Rx impedance of the second antenna. According to another embodiment, the electronic device may select an antenna by comparing received signal strengths of the first antenna and the second antenna. The received signal strength may include a signal to noise ratio (SNR), a reference signals received power (RSRP), a received signal code power (RSCP), or a received signal strength indicator (RSSI). According to another embodiment, the electronic device may determine whether the first impedance is within the threshold range and then select an antenna by comparing the first impedance and the second impedance. According to another embodiment, the electronic device may determine whether the first impedance is within the threshold range and then select an antenna by comparing the received signal strengths of the antennas.

The electronic device may more accurately determine the antenna performance of the electronic device by using the first impedance, the second impedance, or the received signal strengths of the antennas, in addition to the magnitude of the first signal and the magnitude of the second signal. The operations shown in FIG. 7 may be modified according to various embodiments of the disclosure, and the order of the operations may be changed. In addition, the operations are not necessarily to be performed sequentially, and the operations may be performed at the same time.

Figure 8:
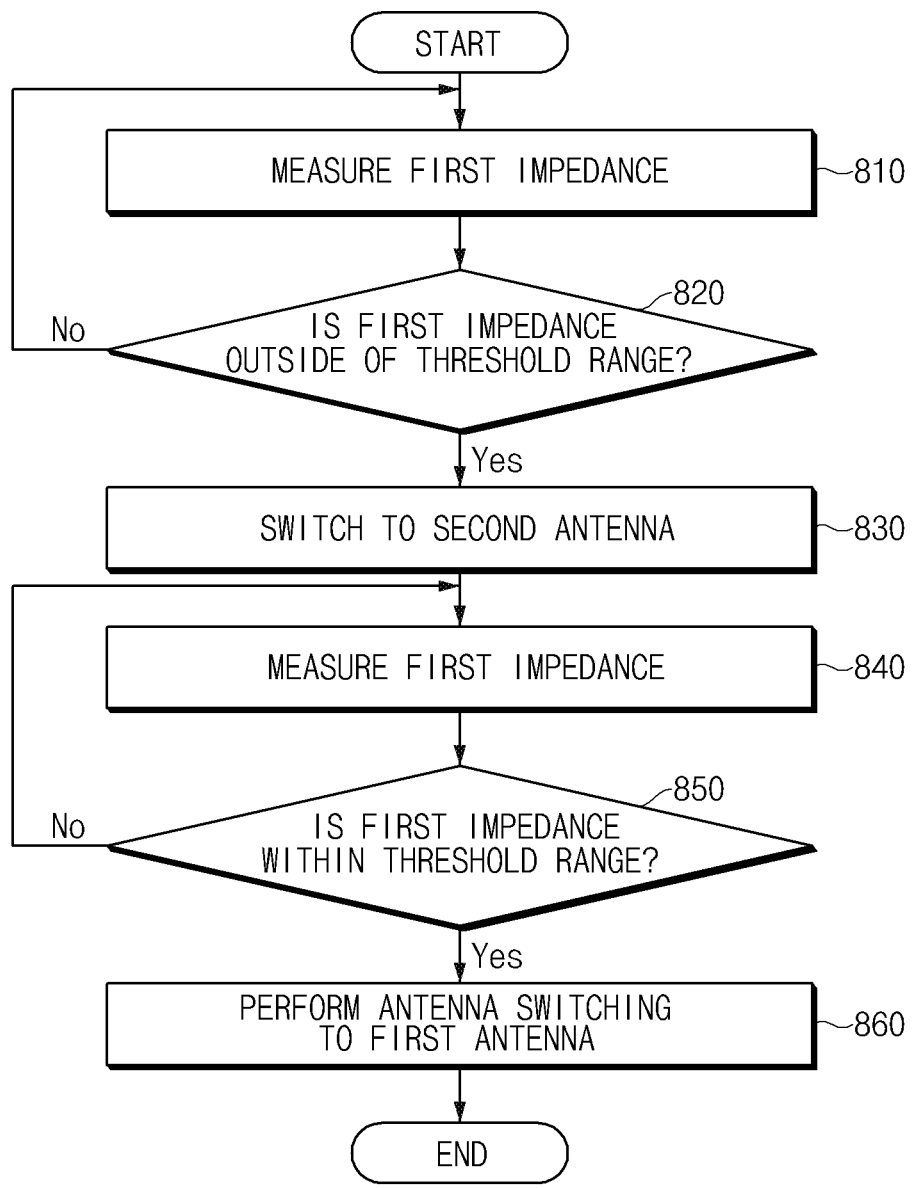
FIG. 8 is a flowchart of an operation of an electronic device for switching from a first antenna to a second antenna based on a first impedance according to various embodiments.

FIG. 8 is a flowchart of an operation of an electronic device for switching from a first antenna to a second antenna based on a first impedance according to various embodiments. The operations shown in FIG. 8 may be performed by an electronic device (e.g., the electronic device 100, 200, or 300) or a processor (e.g., the processor 180) included in the electronic device.

Referring to FIG. 8, in operation 810, the electronic device (e.g., the processor 180) may measure a first impedance corresponding to a first antenna (e.g. the antenna 151). The first impedance may include a Tx impedance or a Rx impedance of the first antenna. The electronic device may measure the first impedance using a detection circuit (e.g., the sensing circuit 171, 270, or 370). The electronic device may measure the first impedance at a predetermined period.

In operation 820, the electronic device may determine whether the measured first impedance is outside of a threshold range. When the first impedance is within the threshold range, the electronic device may repeatedly perform operation 810 without performing antenna switching. When the first impedance is outside of the threshold range, in operation 830, the electronic device may switch from the first antenna to the second antenna.

After switching to the second antenna, in operation 840, the electronic device may periodically measure the first impedance. In operation 850, the electronic device may determine whether the measured first impedance is within the threshold range. When the first impedance is outside of the threshold range, the electronic device may repeatedly perform operation 840 without operating antenna switching. When the first impedance is within the threshold range, in operation 860, the electronic device may switch from the second antenna to the first antenna.

The electronic device may take Tx performance of the antenna into account by determining whether to switch the antenna based on a Tx (or Rx) impedance of the first antenna. The operations shown in FIG. 8 may be modified according to various embodiments of the disclosure, and the order of the operations may be changed. In addition, the operations are not necessarily to be performed sequentially, and the operations may be performed at the same time.

Figure 9:
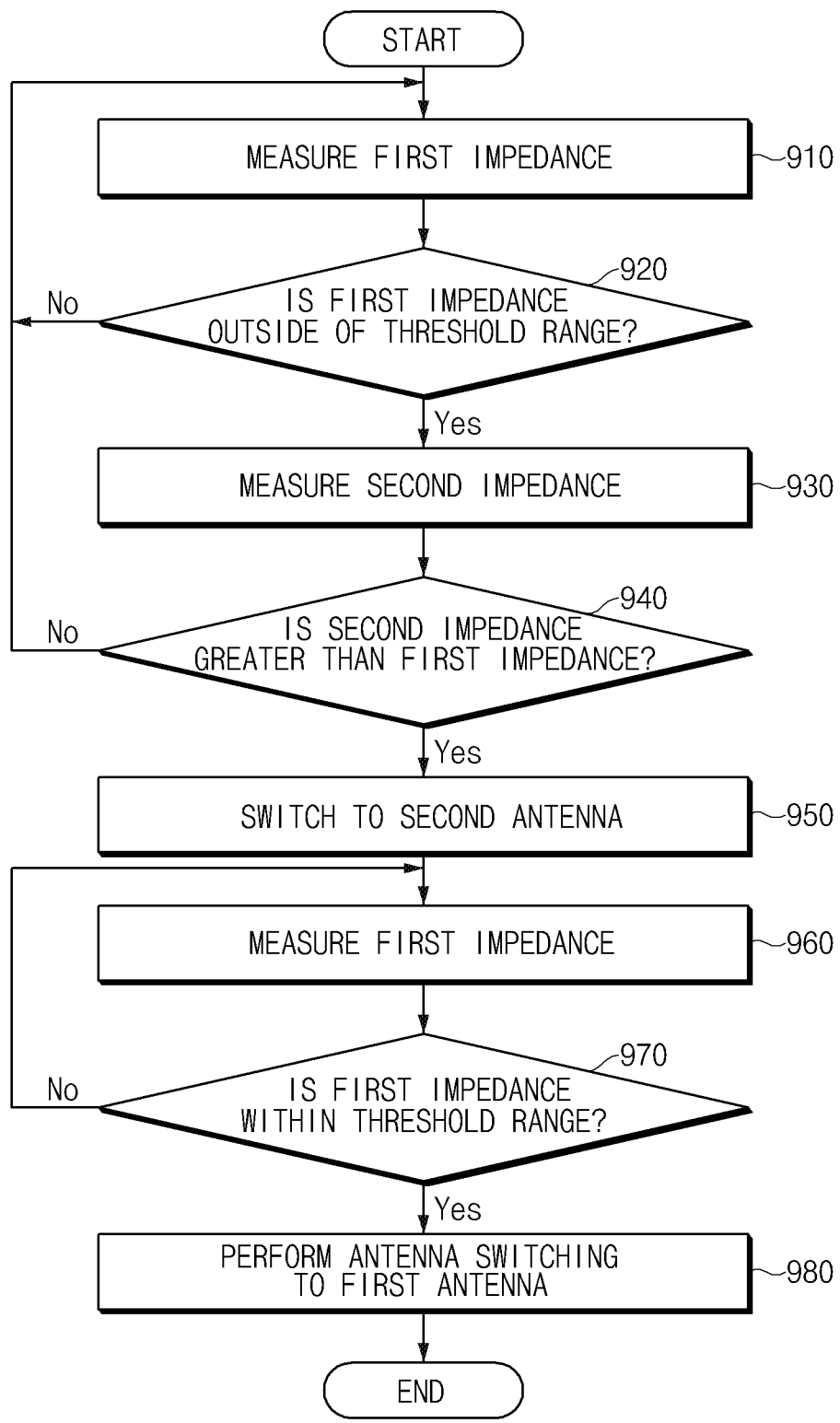
FIG. 9 is a flowchart of an operation of an electronic device for switching from a first antenna to a second antenna based on a first impedance and a second impedance according to various embodiments.

FIG. 9 is a flowchart of an operation of an electronic device for switching from a first antenna to a second antenna based on a first impedance and a second impedance according to various embodiments. The operations shown in FIG. 9 may be performed by an electronic device (e.g., the electronic device 100, 200, or 300) or a processor (e.g., the processor 180) included in the electronic device.

Referring to FIG. 9, in operation 910, an electronic device (e.g. the processor 180) may measure a first impedance corresponding to a first antenna (e.g. the antenna 151), and in operation 920, the electronic device may determine whether the measured first impedance is outside of a threshold range. When the first impedance is not outside of the threshold range, the electronic device may repeatedly perform operation 910 without performing antenna switching. When the first impedance is within the threshold range, in operation 930, the electronic device may measure a second impedance corresponding to a second antenna (e.g., the antenna 152).

In operation 940, the electronic device may determine whether the second impedance is greater than the first impedance. When the second impedance is not greater than the first impedance, the electronic device may repeatedly perform the processes of operations 910 to 940 without performing antenna switching. When the second impedance is greater than the first impedance, in operation 950, the electronic device may switch from the first antenna to the second antenna.

In operations 960 to 980, the electronic device may perform the same as or similar processes to those of operations 840 to 860 of FIG. 8. In other words, the electronic device may determine whether to switch from the second antenna to the first antenna by periodically measuring the first impedance even after switching to the second antenna. Although FIG. 9 illustrates an operation in which the electronic device periodically measures only the first impedance after switching to the second antenna, according to various embodiments disclosed therein, the electronic device may determine whether to switch from the second antenna to the first antenna by periodically measuring the first impedance and the second impedance.

The electronic device may determine Tx performance of the antenna more precisely by determining whether to switch the antenna based on the Tx (or Rx) impedance of the first antenna as well as the Tx (or Rx) impedance of the second antenna. The operations shown in FIG. 9 may be modified according to various embodiments of the disclosure, and the order of the operations may be changed. In addition, the operations are not necessarily to be performed sequentially, and the operations may be performed at the same time.

Figure 10:
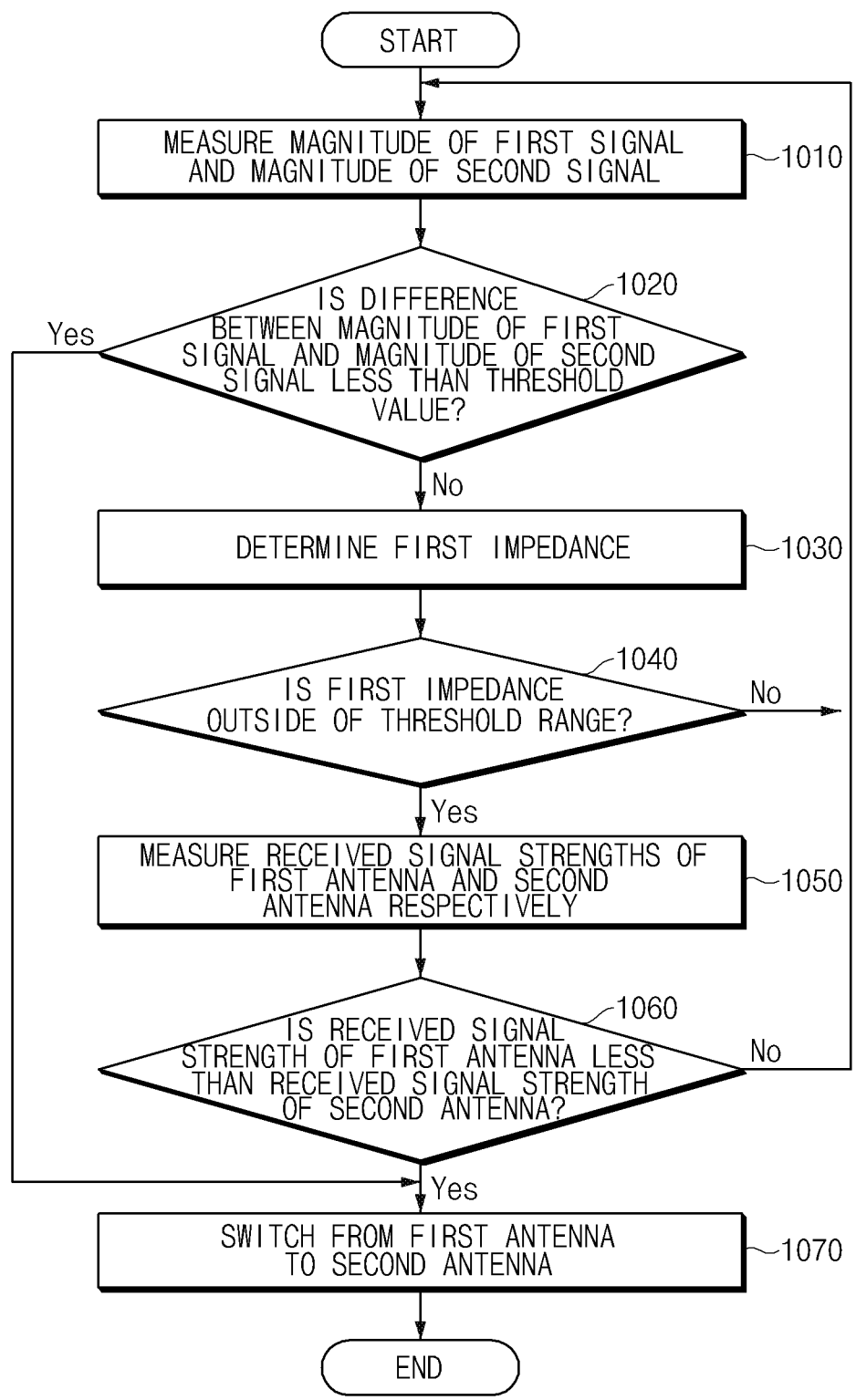
FIG. 10 is a flowchart of an operation of an electronic device for switching from a first antenna to a second antenna based on a first impedance and a received signal strength according to various embodiments.

FIG. 10 is a flowchart of an operation of an electronic device for switching from a first antenna to a second antenna based on a first impedance and a received signal strength according to various embodiments. The operations shown in FIG. 10 may be performed by an electronic device (e.g., the electronic device 100, 200, or 300) or a processor (e.g., the processor 180) included in the electronic device.

Referring to FIG. 10, in operation 1010, the electronic device (e.g., the processor 180) may measure a magnitude of a signal (that is, the first signal) transmitted through a first antenna (e.g., the antenna 151) and a magnitude of the signal (that is, the second signal) transmitted through the first antenna and received through a second antenna (e.g., the antenna 152). For example, referring to FIG. 4, the electronic device may determine the magnitude of the first signal based on a difference between the magnitude of a signal transferred through the path 491 and the magnitude of a signal reflected from the antenna 151 and determine the magnitude of the second signal based on the magnitude of a signal transferred through the path 492.

In operation 1020, the electronic device may determine whether a difference between the magnitude of the first signal and the magnitude of the second signal is less than a predetermined threshold value. The threshold value may be determined based on the magnitude of the first signal and the magnitude of the second signal in a state in which there is no external object around the electronic device (or in a state in which there is no an external object around the first antenna and the second antenna). When a difference between the magnitude of the first signal and the magnitude of the second signal is less than the threshold value ((the magnitude of the first signal−the magnitude of the second signal)<the threshold value), the electronic device may immediately perform switching from the first antenna to the second antenna in operation 1070 without further measuring antenna performance. When a difference between the magnitude of the first signal and the magnitude of the second signal is greater than or equal to the threshold value ((the magnitude of the first signal−the magnitude of the second signal)≥the threshold value), the electronic device may perform the process of operation 1030 to further measure antenna performance.

In operation 1030, the electronic device may determine a first impedance corresponding to the first antenna, and in operation 1040, the electronic device may determine whether the first impedance is outside of the threshold range. When the first impedance is not outside of the threshold range, the electronic device may repeatedly perform the processes of operations 1010 to 1040. When the first impedance is outside of the threshold range, the electronic device may proceed to operation 1050.

In operation 1050, the electronic device may measure a received signal strength of each of the first antenna and the second antenna and in operation 1060, determine whether the received signal strength of the first antenna is less than the received signal strength of the second antenna. The received signal strength may be expressed by RSSI, RSRP, RSCP, or SNR. When the received signal strength of the first antenna is less than the received signal strength of the second antenna, in operation 1070, the electronic device may switch from the first antenna to the second antenna. If the first antenna received signal strength is not less than the received signal strength of the second antenna, the electronic device may repeatedly perform operations 1010 to 1060.

The operations shown in FIG. 10 may be modified according to various embodiments of the disclosure, and the order of the operations may be changed. In addition, the operations are not necessarily to be performed sequentially, and the operations may be performed at the same time.

Figure 11:
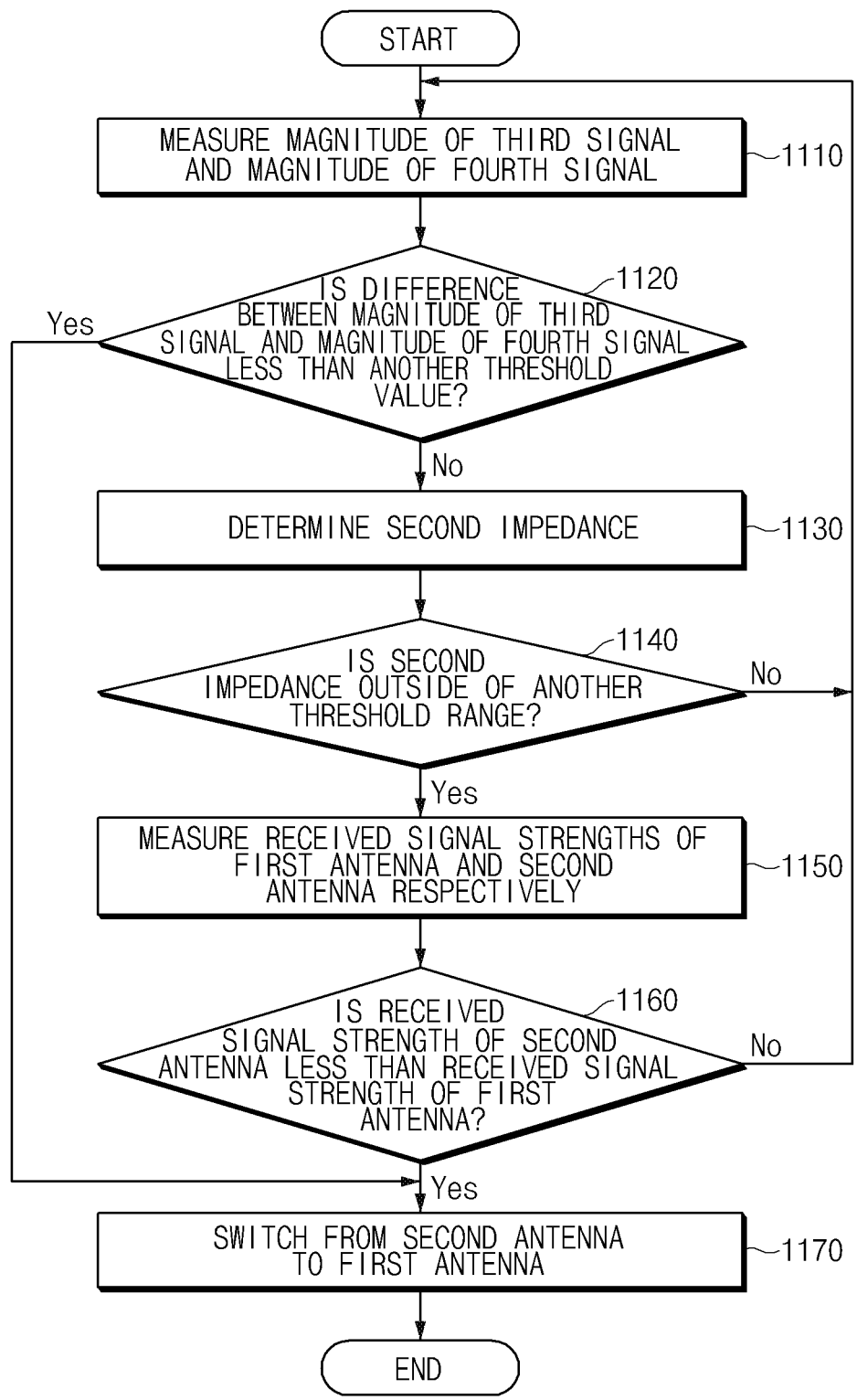
FIG. 11 is a flowchart of an operation of an electronic device for switching from a second antenna to a first antenna according to various embodiments.

FIG. 11 is a flowchart of an operation of an electronic device for switching from a second antenna to a first antenna according to various embodiments. The operations shown in FIG. 11 may be performed by an electronic device (e.g., the electronic device 100, 200, or 300) or a processor (e.g., the processor 180) included in the electronic device.

Referring to FIG. 11, in operation 1110, the electronic device (e.g., the processor 180) may measure a magnitude of a signal (that is, a third signal) transmitted through a second antenna (e.g., the antenna 152) and measure a magnitude of a signal (that is, a fourth signal) transmitted through the second antenna and received through a first antenna (e.g., the antenna 151). For example, referring to FIG. 5, the electronic device 100 may determine the magnitude of the third signal based on a difference between the magnitude of a signal transferred through the path 591 and the magnitude of a signal reflected from the antenna 152 and determine the magnitude of the fourth signal based on the magnitude of a signal transferred through the path 592.

In operation 1120, the electronic device may determine whether a difference between the magnitude of the third signal and the magnitude of the fourth signal is less than another predetermined threshold value. The another threshold value may be determined based on the magnitude of the third signal and the magnitude of the fourth signal in a state in which there is no external object around the electronic device (or in a state in which there is no an external object around the first antenna and the second antenna). The another threshold value may be expressed in signal power or in magnitude and phase in the Smith chart. The another threshold value may be stored in the electronic device (e.g., the memory 185) in the form of a lookup table. When a difference between the magnitude of the third signal and the magnitude of the fourth signal is less than the another threshold value ((the magnitude of the third signal−the magnitude of the fourth signal)<the another threshold value), in operation 1170, the electronic device may switch from the second antenna to the first antenna. When a difference between the magnitude of the third signal and the magnitude of the fourth signal is greater than or equal to the another threshold value ((the magnitude of the third signal−the magnitude of the fourth signal)≥the another threshold value), the electronic device may perform the process of the operation 1130.

In operation 1130, the electronic device may determine a second impedance corresponding to the second antenna, and in operation 1140, the electronic device may determine whether the second impedance is outside of another threshold range. The another threshold range may be used to determine the Tx/Rx performance of an antenna in the Smith chart. The another threshold range may be stored in the electronic device (e.g., the memory 185) in the form of a lookup table. When the second impedance is not outside of the threshold range, the electronic device may repeatedly perform the processes of operations 1110 to 1140. When the second impedance is outside of the another threshold range, the electronic device may proceed to operation 1150.

In operation 1150, the electronic device may measure a received signal strength of each of the first antenna and the second antenna, and in operation 1160, determine whether the received signal strength of the second antenna is less than the received signal strength of the first antenna. When the received signal strength of the second antenna is less than the received signal strength of the first antenna, in operation 1170, the electronic device may switch from the second antenna to the first antenna. When a received signal strength of the second antenna is not less than a received signal strength of the first antenna, the electronic device may repeatedly perform the processes of operation 1110 to 1160.

The operations shown in FIG. 11 may be modified according to various embodiments of the disclosure, and the order of the operations may be changed. In addition, the operations are not necessarily to be performed sequentially, and the operations may be performed at the same time.

As described above, according to the various embodiments disclosed therein, a method for the electronic device (e.g., the electronic device 100, 200 or 300) may include transmitting a signal through a first antenna (e.g., the antenna 151), acquiring at least a part of the signal through a second antenna (e.g., the antenna 152) and measuring a magnitude of the acquired signal, determining one of the first antenna and the second antenna based on at least the magnitude of the acquired signal and connecting the determined antenna and a wireless communication circuit (e.g., the wireless communication circuit 105, 205, or 305).

According to one embodiment, the method for the electronic device may further include measuring the magnitude of the signal transmitted through the first antenna, wherein the determining of the antenna may include determining one of the first antenna and the second antenna based on a difference between the magnitude of the signal transmitted through the first antenna and the magnitude of the signal received through the second antenna.

According to one embodiment, the method for the electronic device may further include determining a first impedance corresponding to the first antenna, wherein the determining of the antenna may include determining one of the first antenna and the second antenna based on the first impedance. Furthermore, according to one embodiment, the method for the electronic device may further include determining a second impedance corresponding to the second antenna, wherein the determining of the antenna may include one of the first antenna and the second antenna based on the first impedance and the second impedance.

According to one embodiment, the method for the electronic device may further include measuring a received signal strength of the first antenna and a received signal strength of the second antenna, wherein the determining of the antenna may include determining one of the first antenna and the second antenna based on the received signal strength of the first antenna and the received signal strength of the second antenna.

Figure 12:
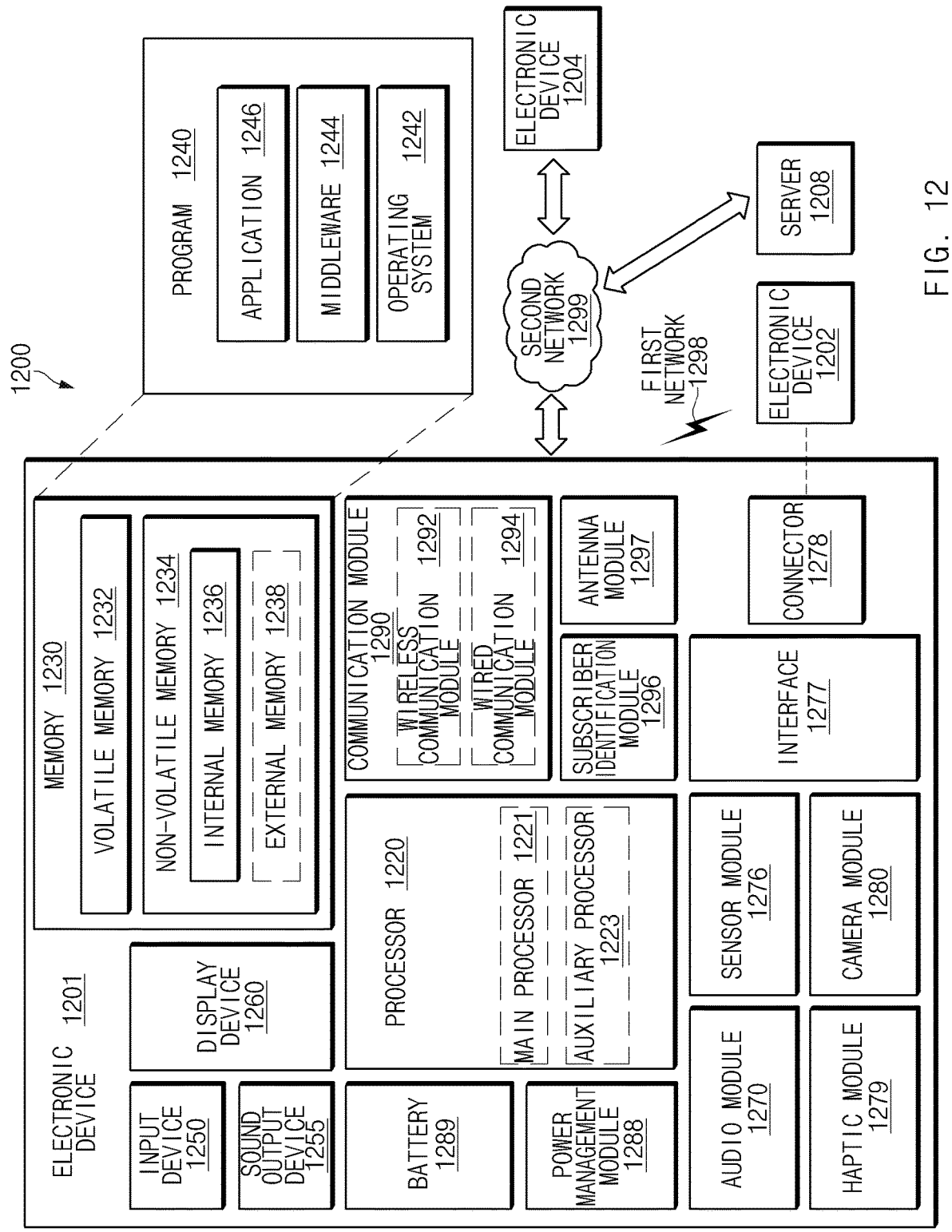
FIG. 12 is a block diagram of an electronic device in a network environment, according to various embodiments.

FIG. 12 is a block diagram of an electronic device 1201 in a network environment 1200, according to various embodiments. Referring to FIG. 12, in the network environment 1200, the electronic device 1201 (e.g., the electronic device 100, 200, or 300) may communicate with an electronic device 1202 via a first network 1298 (e.g., the short-range wireless communication) or communicate with an electronic device 1204 or a server 1208 via a second network 1299 (e.g., long distance wireless communication). According to one embodiment, the electronic device 1201 may communicate with the electronic device 1204 through the server 1208. According to one embodiment, the electronic device 1201 may include a processor 1220 (e.g. the processor 180), a memory 1230 (e.g. the memory 185), an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module 1296, and an antenna module 1297 (e.g., the antennas 151 and 152). In some embodiments, at least one of the components (e.g., the display device 1260 or the camera module 1280) may be omitted in the electronic device 1201 or another component may be added to the electronic device 1201. In some embodiments, some components may be implemented in an integrated manner such as the case of the sensor module 1276 (e.g., a fingerprint sensor, an iris sensor, or an illumination sensor) embedded in the display device 1260 (e.g., display) for example.

The processor 1220 may control at least one other component (e.g., a hardware or software component) of electronic device 1201 connected to the processor 1220 by driving, for example, software (e.g., a program 1240) and perform various data processing and calculation. The processor 1220 may load and process a command or data received from another component (e.g., the sensor module 1276 or the communication module 1290) onto a volatile memory 1232, and store resulting data in a nonvolatile memory 1234. According to one embodiment, the processor 1220 may include a main processor 1221 (e.g., a central processing unit or an application processor) and an auxiliary processor 1223 that operates independently of the main processor 1221, additionally or alternatively uses lower power than main processor 1221 and is specialized for a designated function (e.g., a graphics processing unit, an image signal processor, a sensor hub processor, or a communication processor). Here, the auxiliary processor 1223 may be managed in a state of being separately from or embedded in the main processor 1221.

In this case, the auxiliary processor 1223 may control at least some of functions or states associated with at least one component (e.g., the display device 1260, the sensor module 1276, or the communication module 1290) among at least one of the components of the electronic device 1201, for example, instead of the main processor 1221 while the main processor 1221 is in an inactive (e.g., sleep) state, or together with the main processor 1221 while the main processor 1221 is in an active (e.g., application execution) state. According to one embodiment, the auxiliary processor 1223 (e.g., an image signal processor or a communication processor) may be implemented as a partial component of another functionally-related component (e.g., the camera module 1280 or the communication module 1290). The memory 1230 may store various data used by at least one component of the electronic device 1201 (e.g., the processor 1220 or the sensor module 1276), for example, software (e.g., the program 1240) and input data or output data for a command related thereto. The memory 1230 may include the volatile memory 1232 or the nonvolatile memory 1234.

The program 1240 may be software stored in the memory 1230, and may include, for example, an operating system 1242, middleware 1244, or an application 1246.

The input device 1250 may be a device for receiving a command or data to be used for a component (e.g., the processor 1220) of the electronic device 1201 from the outside (e.g., a user) of the electronic device 1201, and may include, for example, a microphone, a mouse, or a keyboard.

The sound output device 1255 may be a device for outputting sound signals to the outside of the electronic device 1201, and include, for example, a speaker used for general purposes, such as multimedia playback or recording playback, and a receiver used for telephone reception only. According to one embodiment, the receiver may be formed integrally with or separately from the speaker.

The display device 1260 may be a device for visually providing information to a user of the electronic device 1201, and include, for example, a display, a hologram device or a projector, and a control circuit for controlling a relevant device. According to one embodiment, the display device 1260 may include a touch circuitry or a pressure sensor capable of measuring a strength of pressure for touch.

The audio module 1270 may bi-directionally convert a sound and an electrical signal. According to one embodiment, the audio module 1270 may acquire sound through the input device 1250, or output sound through the sound output device 1255 or an external electronic device (e.g., the electronic device 1202)(e.g., a speaker or a headphone) connected to the electronic device 1201 in a wired manner or a wireless manner.

The sensor module 1276 may generate an electrical signal or a data value corresponding to an operational state (e.g., power or temperature) of the interior of the electronic device 1201 or an external environmental condition. The sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1277 may support a specified protocol capable of performing connection to an external electronic device (e.g. the electronic device 1202) in a wired or wireless manner. According to one embodiment, the interface 1277 may include a high definition multimedia interface (HDMI), a universal serial bus (USB) interface, an SD card interface, or an audio interface.

The connecting terminal 1278 may be a connector for physically connecting the electronic device 1201 to an external electronic device (e.g., the electronic device 1202), for example, an HDMI connector, a USB connector, an SD card connector, or an audio connector. (e.g., a headphone connector).

The haptic module 1279 may convert an electrical signal into a mechanical stimulus (e.g., vibration or movement) or an electrical stimulus that may be perceived by the user through tactile or kinesthetic senses. The haptic module 1279 may include, for example, a motor, a piezoelectric element, or an electrical stimulation device.

The camera module 1280 may photograph a still image and a moving image. According to one embodiment, the camera module 1280 may include one or more lenses, an image sensor, an image signal processor, or a flash.

The power management module 1288, which is a module for managing power supplied to the electronic device 1201, may be configured as at least a part of, for example, a power management integrated circuit (PMIC).

The battery 1289 may be a device for powering at least one component of the electronic device 1201, and may include, for example, a non-rechargeable primary cell, a rechargeable secondary cell, or a fuel cell.

The communication module 1290 may support establishment of a wired or wireless communication channel between the electronic device 1201 and an external electronic device (e.g., the electronic device 1202, the electronic device 1204, or the server 1208), and performance of communication through the established communication channel. The communication module 1290 may include one or more communication processors that support wired or wireless communication, which is managed independently of the processor 1220 (e.g., an application processor). According to one embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication module) and communicate with an external electronic device through the first network 1298 (e.g., a short-range communication network, such as, Bluetooth, WiFi direct, or infrared data association (IrDA)) or the second network 1299 (e.g., a long-distance communication network such as a cellular network, the Internet, or a computer network (e.g., LAN or WAN)) using a relevant communication module of the communication modules. The various types of communication modules 1290 described above may be implemented as one chip or each separate chip.

According to one embodiment, the wireless communication module 1292 may identify and authenticate the electronic device 1201 in a communication network by using user information stored in the subscriber identification module 1296.

The antenna module 1297 may include one or more antennas for transmitting or receiving signals or power to or from the outside. According to one embodiment, the communication module 1290 (e.g., the wireless communication module 1292) may transmit a signal to or receive a signal from an external electronic device through an antenna suitable for a communication scheme.

Some of the components described above may be connected to each other through a communication method between peripheral devices (e.g., a bus, a general purpose input/output (GPIO), a serial peripheral interface (SPI), or a mobile industry processor interface (MIPI)) and exchange signals (e.g., commands or data) between each other.

According to various embodiments, the commands or the data may be transmitted or received between the electronic device 1201 and the external electronic device 1204 via the server 1208 connected to the second network 1299. The electronic devices 1202 and 1204 may be the same or a different kind of device as the electronic device 1201. According to one embodiment, all or some of operations performed in the electronic device 1201 may be performed in another electronic device or a plurality of electronic devices. According to one embodiment, when the electronic device 1201 needs to perform a certain function or service automatically or at a request, the electronic device 1201 may request at least some related functions from an external electronic device additionally or rather than execute the functions or services by itself. The external electronic device, received the request, may execute the requested function or an additional function and transfer a result thereof to the electronic device 1201. The electronic device 1201 may process the received result as it is or additionally process to provide the requested function or service. To this end, for example, cloud computing, distributed computing, or client-server computing technology may be used.

According to various embodiments disclosed herein, the electronic device may be various forms of devices. The electronic device may include at least one of, for example, a portable communication device (e.g., a smartphone), a computer device, a portable multimedia device, a portable medical device, a camera, a wearable device, or a home appliance. An electronic device according to an embodiment of the disclosure is not limited to the above-described devices.

Various embodiments of the disclosure and terms used therein are not intended to limit the techniques described in this disclosure to specific embodiments, but should be understood to include various modifications, equivalents, and/or substitutes of the embodiments. With regard to description of drawings, similar components may be marked by similar reference numerals. As used herein, singular forms may include plural forms as well unless the context clearly indicates otherwise. In the disclosure, the expressions "A or B", "at least one of A or/and B", "A, B or C", "at least one of A, B or/and C", and the like may include any and all combinations of one or more of the associated listed items. The terms, such as "first", "second", and the like used in the disclosure may be used to refer to various components regardless of the order and/or the priority and to distinguish the relevant components from other components, but do not limit the components. It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. For example, the module may be configured by an application-specific integrated circuit (ASIC).

Various embodiments of the present disclosure may be implemented in software (e.g., the program 1240) including instructions stored in a machine-readable storage media (e.g., an internal memory 1236 or an external memory 1238). The machine may be a device capable of calling a stored instruction from a storage medium and operating in accordance with the called instruction, and may include an electronic device (e.g., the electronic device 1201) according to the disclosed embodiments. The instruction, when executed by a processor (e.g., the processor 1220), may cause the processor to perform a function corresponding to the instruction directly or using other components under the control of the processor. The instruction may include codes generated or executed by a compiler or interpreter. The machine-readable storage medium may be provided in the form of a non-transitory storage medium. Here 'non-transitory' means that the storage medium does not include a signal and is tangible, and does not distinguish whether data is stored semi-permanently or temporarily on the storage medium.

According to an embodiment, a method according to various embodiments disclosed in the disclosure may be included in a computer program product. The computer program product may be traded between a seller and a buyer as a product. The computer program product may be distributed in the form of a machine-readable storage medium (e.g., compact disc read only memory (CD-ROM)) or online through an application store (e.g., Play Store™). In the case of online distribution, at least a portion of the computer program product may be stored at least temporarily or temporarily created in a storage medium such as a server of a manufacturer, a server of an application store, or a memory of a relay server.

Each component (e.g., a module or a program) according to various embodiments may be composed of a singular or plural number of objects, and some of the above-described subcomponents may be omitted, or other subcomponents may be further included in the various embodiments. Alternatively or additionally, some components (e.g., modules or programs) may be integrated into one entity to perform the same or similar functions performed by the components prior to integration. Operations performed by a module, a program, or other components according to various embodiments may be executed sequentially, in parallel, repeatedly, or in a heuristic method. In addition, some operations may be executed in different sequences or may be omitted or other operations may be added.

The invention claimed is:

1. An electronic device comprising:
   a first antenna and a second antenna;
   a wireless communication circuit configured to be electrically connected to the first antenna and the second antenna and transmit and/or receive a signal through the first antenna and the second antenna;
   a switch configured to be electrically connected to the wireless communication circuit and be selectively connected to one of the first antenna and the second antenna;
   a detection circuit configured to measure a magnitude of a first signal transmitted through the first antenna and a magnitude of a second signal through the second antenna, the second signal being obtained from at least a part of the first signal transmitted through the first antenna,
   a first coupler disposed between the first antenna and the wireless communication circuit to transfer at least a part of a signal output from the wireless communication circuit and at least a part of a signal reflected from the first antenna to the detection circuit;
   a second coupler disposed between the second antenna and the wireless communication circuit to transfer at least a part of the second signal to the detection circuit; and
   another switch disposed between couplers and the detection circuit, the couplers including the first coupler and the second coupler, and connected to one of the first coupler and the second coupler.

2. The electronic device of claim 1, wherein the detection circuit includes
   a first detection circuit configured to be electrically connected to the first coupler to measure the magnitude of the first signal based on a difference between a magnitude of the signal output from the wireless communication circuit and a magnitude of the signal reflected from the first antenna; and
   a second detection circuit configured to be electrically connected to the second coupler to measure the magnitude of the second signal.

3. The electronic device of claim 1,
   wherein the switch is disposed between couplers and the wireless communication circuit.

4. The electronic device of claim 2, wherein the first detection circuit is configured to measure a first impedance corresponding to the first antenna.

5. The electronic device of claim 4, wherein the second detection circuit is configured to measure a second impedance corresponding to the second antenna.

6. The electronic device of claim 1, wherein the wireless communication circuit includes the detection circuit.

7. An electronic device comprising:
   a first antenna and a second antenna;
   a wireless communication circuit configured to be electrically connected to the first antenna and the second antenna and transmit and/or receive a signal through the first antenna and the second antenna;
   a switch configured to be electrically connected to the wireless communication circuit and be selectively connected to one of the first antenna and the second antenna; and
   a processor electrically connected to the switch, wherein the processor is configured to:

identify a magnitude of a first signal transmitted through the first antenna and a magnitude of a second signal through the second antenna, the second signal being obtained from at least a part of the first signal transmitted through the first antenna, determine whether to identify a first impedance corresponding to the first antenna, based on difference between the magnitude of the first signal and the magnitude of the second signal, identify a magnitude of a received signal of the first antenna and a magnitude of a received signal of the second antenna when the first impedance is outside of a threshold range, determine one of the first antenna and the second antenna based on the magnitude of the received signal of the first antenna and the magnitude of the received signal of the second antenna, and connect the determined antenna to the wireless communication circuit by using the switch.

8. The electronic device of claim 7, further comprising:
a detection circuit configured to measure the magnitude of the first signal and the magnitude of the second signal.

9. The electronic device of claim 7, wherein the processor is configured to:

connect the second antenna to the wireless communication circuit by using the switch when the first impedance is outside of the threshold range, and connect the first antenna to the wireless communication circuit by using the switch when the first impedance is within the threshold range.

10. The electronic device of claim 7, wherein the processor is configured to:

identify a second impedance corresponding to the second antenna, and determine one of the first antenna and the second antenna based on the first impedance and the second impedance.

* * * * *